(12) United States Patent
Lee

(10) Patent No.: US 11,623,150 B2
(45) Date of Patent: Apr. 11, 2023

(54) RENDERING METHOD FOR DRONE GAME

(71) Applicant: Compal Electronics, Inc., Taipei (TW)

(72) Inventor: Hsiao-Chung Lee, Taipei (TW)

(73) Assignee: COMPAL ELECTRONICS, INC, Taipei (TW)

( * ) Notice: Subject to any disclaimer, the term of this patent is extended or adjusted under 35 U.S.C. 154(b) by 0 days.

(21) Appl. No.: 17/487,425

(22) Filed: Sep. 28, 2021

(65) Prior Publication Data

US 2022/0410018 A1 Dec. 29, 2022

(30) Foreign Application Priority Data

Jun. 24, 2021 (TW) ................. 110123193

(51) Int. Cl.

| A63F 13/803 | (2014.01) |
|---|---|
| G01W 1/02 | (2006.01) |
| A63F 13/655 | (2014.01) |
| G06T 3/40 | (2006.01) |
| A63F 13/213 | (2014.01) |
| H04N 23/698 | (2023.01) |

(52) U.S. Cl.
CPC .......... *A63F 13/803* (2014.09); *A63F 13/213* (2014.09); *A63F 13/655* (2014.09); *G01W 1/02* (2013.01); *G06T 3/4038* (2013.01); *H04N 23/698* (2023.01)

(58) Field of Classification Search
CPC ....... A63F 13/804; A63F 13/213; G01W 1/02
See application file for complete search history.

(56) References Cited

U.S. PATENT DOCUMENTS

| 10,084,960 B2 | 9/2018 | Pettegrew et al. |
|---|---|---|
| 10,303,172 B2 | 5/2019 | Hwang et al. |
| 10,684,654 B2 | 6/2020 | Shin et al. |
| 2006/0287105 A1* | 12/2006 | Willis ............ A63F 13/12 463/1 |
| 2013/0079100 A1 | 3/2013 | Nicely |
| 2016/0105649 A1* | 4/2016 | Pettegrew ............ G06T 3/4038 348/37 |

(Continued)

FOREIGN PATENT DOCUMENTS

| CN | 110772782 A | 2/2020 |
|---|---|---|
| CN | 113014888 A | 6/2021 |

(Continued)

*Primary Examiner* — James S. McClellan
(74) *Attorney, Agent, or Firm* — Kirton McConkie; Evan R. Witt

(57) ABSTRACT

A rendering method for a drone game includes the following steps. Firstly, a drone, a control device, a display device and an information node are provided. The drone includes a plurality of cameras. Then, a plurality of images acquired from the plurality of cameras of the drone are stitched as a panoramic image by the control device, and the panoramic image is displayed on the display device. Then, a ready signal is issued from the information node to the display device, and the control device accesses the drone game through an authorization of the information node in response to the ready signal. Then, at least one virtual object is generated in the panoramic image. Consequently, the sound, light and entertainment effects of the drone game are effectively enhanced, and the fun and diversity of the drone game are increased.

12 Claims, 9 Drawing Sheets

(56) References Cited

U.S. PATENT DOCUMENTS

| | | | | |
|---|---|---|---|---|
| 2018/0036632 A1* | 2/2018 | Poynter | .................... | A63K 3/00 |
| 2018/0361248 A1* | 12/2018 | Nomura | ................ | A63F 13/847 |
| 2019/0324448 A1 | 10/2019 | Pohl et al. | | |
| 2021/0031109 A1* | 2/2021 | Konyndyk | .............. | A63F 13/26 |

FOREIGN PATENT DOCUMENTS

| | | | |
|---|---|---|---|
| JP | 2002159738 | A | 6/2002 |
| JP | 2020194519 | A | 12/2020 |
| KR | 20170138752 | A | 12/2017 |
| TW | I476505 | B | 3/2015 |
| TW | I528328 | B | 4/2016 |
| TW | M538410 | U | 3/2017 |
| TW | I619088 | B | 3/2018 |
| TW | I647656 | B | 1/2019 |
| TW | 201909660 | A | 3/2019 |
| TW | I658434 | B | 5/2019 |
| TW | M594769 | U | 5/2020 |
| TW | I696147 | B | 6/2020 |
| WO | 2020235063 | A1 | 11/2020 |
| WO | 2021085572 | A1 | 5/2021 |

\* cited by examiner

RENDERING METHOD FOR DRONE GAME

FIELD OF THE INVENTION

The present invention relates to a rendering method, and more particularly to a rendering method for a drone game.

BACKGROUND OF THE INVENTION

In recent years, with the advancement of camera technologies and battery technologies, remote control drones become more popular. The drones can fly in the three-dimensional space without limitations, and thus the operators can enjoy controlling the drones. Moreover, since the drones are equipped with high-resolution cameras, the drones can implement the aerial photography and even the artistic creation.

Generally, a microcontroller is the core component for controlling the drone. The microcontroller can receive commands from a ground controller to implement the ascending/descending motions or the forward/backward/leftward/rightward flying motions. Conventionally, two flying control methods are used to control the drone. In accordance with the first flying control method, the ground controller is used to directly control the operations of the drone according to the user's vision. In accordance with the second flying control method, the user wears a head-mounted display to control the drone.

The installation of the cameras on the drone can display the images of the real world. However, when the drone is used for the leisure activities, the sound, light and entertainment effects provided by the drone are still insufficient. For example, the drone leisure activities (e.g., World Drone Prix in Dubai) take a lot of money to build the flight competition venues. If an additional rendering method can be performed at the software level, the game fun can be properly increased, and the gaming methods of the drone can be diversified. Moreover, the materials and the associated cost can be reduced.

Therefore, there is a need of providing an improved rendering method for a drone game in order to overcome the drawbacks of the conventional technologies.

SUMMARY OF THE INVENTION

An object of the present invention provides a rendering method for a drone game. By the rendering method of the present invention, a rendering model of the drone is imported into a panoramic image, and the virtual object is randomly synthetized into the panoramic image. Consequently, the sound, light and entertainment effects of the drone game are effectively enhanced, and the fun and diversity of the drone game are increased.

Another object of the present invention provides a rendering method for a drone game. The weather information is acquired, and a special effect is determined according to the weather information. The image of the virtual object shown on a display device generates the special effect. Moreover, since a reward effect of getting the virtual object is triggered, the visual effect is diversified. Consequently, the diversity of the drone game is enhanced.

In accordance with an aspect of the present invention, a rendering method for a drone game is provided. The rendering method includes the following steps. Firstly, a drone, a control device, a display device and an information node are provided. The drone includes a plurality of cameras. Then, a plurality of images acquired from the plurality of cameras of the drone are stitched as a panoramic image by the control device, and the panoramic image is displayed on the display device. Then, a ready signal is issued from the information node to the display device. Thereafter, the control device is allowed to access the drone game through the information node in response to the ready signal. Then, at least one virtual object is generated in the panoramic image.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
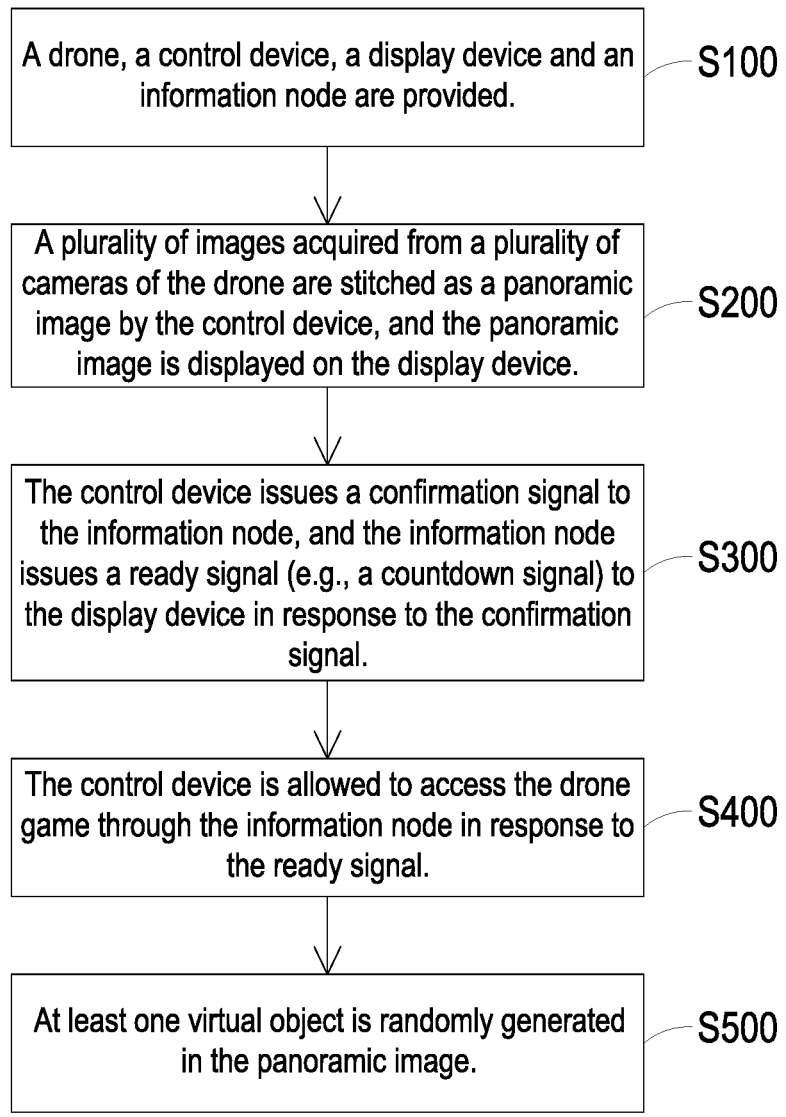
FIG. 1 is a flowchart illustrating a rendering method for a drone game according to a first embodiment of the present invention.

Please refer to FIG. 1. FIG. 1 is a flowchart illustrating a rendering method for a drone game according to a first embodiment of the present invention. The rendering method includes the following steps.

Firstly, in a step S100, a drone, a control device, a display device and an information node are provided. The drone includes a plurality of cameras. An example of the control device includes but is not limited to a handheld remote controller device. For example, the display device is a panel monitor integrated into a handheld remote controller device, or the display device is a head-mounted display. For example, the information node is a base station. It is noted that the examples of the control device, the display device and the information node are not restricted.

Then, in a step S200, a plurality of images acquired from the plurality of cameras of the drone are stitched as a panoramic image by the control device, and the panoramic image is displayed on the display device.

Then, in a step S300, the control device issues a confirmation signal to the information node by the control of the user, and the information node issues a ready signal to the display device in response to the confirmation signal. For example, the ready signal is a countdown signal. The countdown message corresponding to the countdown signal is displayed on the display device. For example, the countdown period is 10 seconds. After the countdown signal is received, the countdown message shown on the display device counts down from 10 to 0.

Then, in a step S400, the control device is allowed to access the drone game through the information node in response to the ready signal. That is, the control device is authorized to control a drone character in the drone game when the countdown message is counted to zero. When the control device is authorized, the control device can issue a control signal to control the drone character. Consequently, the control device can control the takeoff action and the subsequent operations of the drone character.

Then, in a step S500, at least one virtual object is randomly generated, and the image of the virtual object is synthetized into the panoramic image by the control device.

From the above descriptions, the rendering method of the present invention can render the image of the drone appearance into the panoramic image and randomly generate the virtual object. Consequently, the sound, light and entertainment effects of the drone game are effectively enhanced, and the fun and diversity of the drone game are increased.

Moreover, many transportation devices (e.g., buses, airplanes or vehicles) or any other appropriate transportation devices can be used as the information nodes in the future. If the rendering method of the present invention is applied to these information nodes, the capabilities of the information nodes to display information can be effectively enhanced. The displayed information can assist the user in making decisions. In other words, the concepts and effectiveness of the present invention can be expanded.

Figure 2:
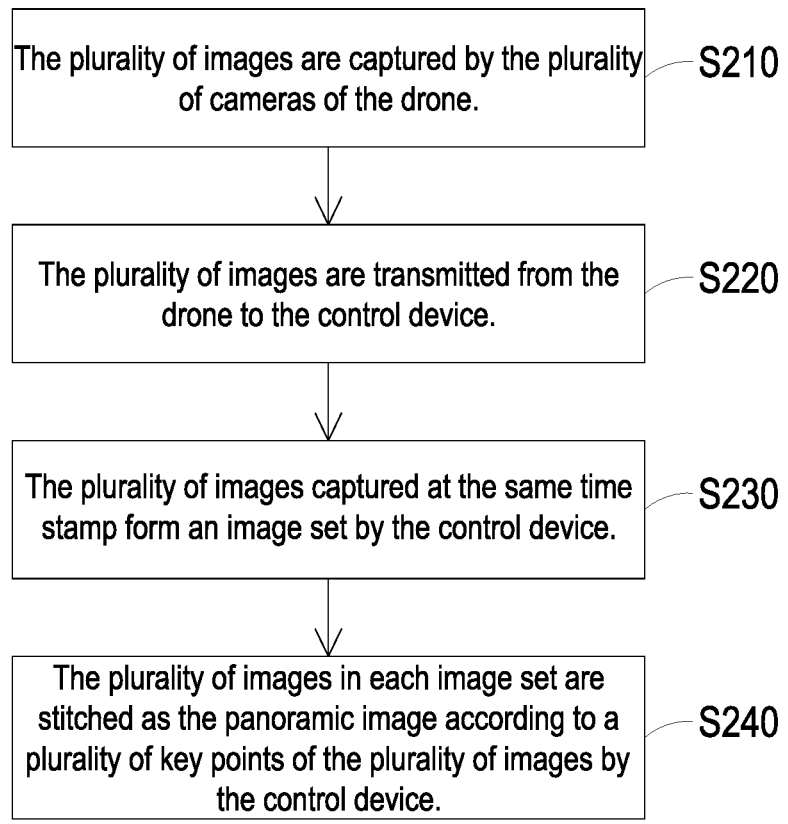
FIG. 2 is a flowchart illustrating the step 5200 of the rendering method for the drone game according to the embodiment as shown in FIG. 1.
Figure 3:
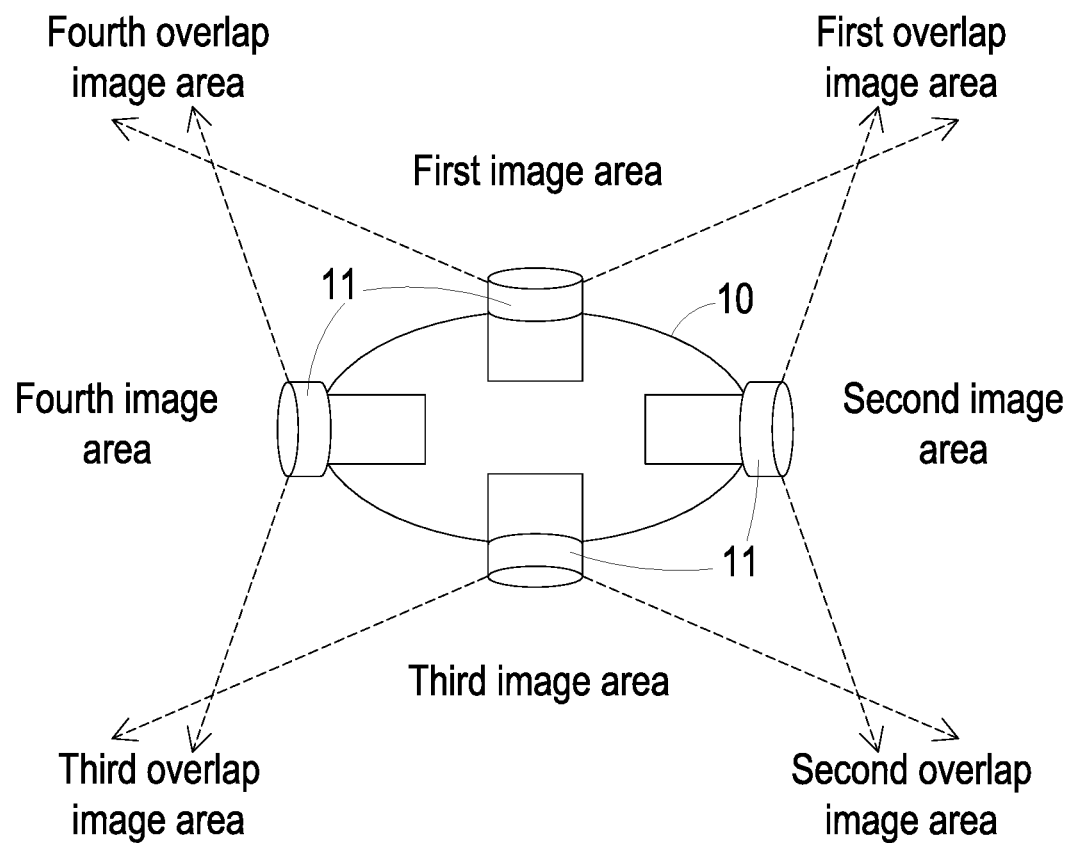
FIG. 3 is a schematic diagram illustrating the plurality of cameras of the drone and the corresponding image areas.

Please refer FIGS. 1, 2, and 3. FIG. 2 is a flowchart illustrating the step S200 of the rendering method for the drone game according to the embodiment as shown in FIG. 1. FIG. 3 is a schematic diagram illustrating the plurality of cameras of the drone and the corresponding image areas. As shown in FIGS. 1, 2 and 3, the drone 10 used in the rendering method of the present invention includes a plurality of cameras 11. As mentioned above, the drone 10 further includes the computing unit. In some embodiments, the drone 10 further includes a motor, a gyroscope, a wireless transmission unit and any other appropriate electronic component. The step S200 of the rendering method includes the following sub-steps S210, S220, S230 and S240. Firstly, in the sub-step S210, the plurality of images are captured by the plurality of cameras 11 of the drone 10. Then, in the sub-step S220, the plurality of images are transmitted from the drone 10 to the control device. Preferably but not exclusively, the step S220 can be implemented with the wireless transmission unit of the drone 10, but not limited thereto. Then, in the sub-step S230, the plurality of images captured at the same time stamp form an image set by the control device. In other words, a plurality of image sets acquired at different time stamps are sequentially generated. Then, in the sub-step S240, the plurality of images in each image set are stitched as the panoramic image according to a plurality of key features of the plurality of images by the control device. That is, the plurality of key features of the plurality of images are used for performing the feature matching operation. In an embodiment, the panoramic image is further processed into a top-view image. After a drone outerwear (i.e., the drone appearance) is checked and selected, the selected drone appearance (e.g., a small space battleship) is synthetized into the top-view image.

Please refer to FIG. 3 again. As shown in FIG. 3, four cameras 11 of the drone 10 are used to capture the plurality of image corresponding to four image area. The four image areas include a first image area, a second image area, a third image area and a fourth image area. The overlap region between the first image area and the second image area is a first overlap image area. The overlap region between the second image area and the third image area is a second overlap image area. The overlap region between the third image area and the fourth image area is a third overlap image area. The overlap region between the fourth image area and the first image area is a fourth overlap image area. After the first image area, the second image area, the third image area and the fourth image area are combined together and the extra pixels in the overlap image areas are removed, the plurality of images can be stitched as the panoramic image. In an embodiment, any part of the panoramic image can be extracted and zoomed, and the aforementioned image information can be transmitted to the base station by means of for example but not limited to 5G communication. The extracted and zoomed signal can be triggered by a touch screen or a joystick of the ground control device or control unit.

Figure 4:
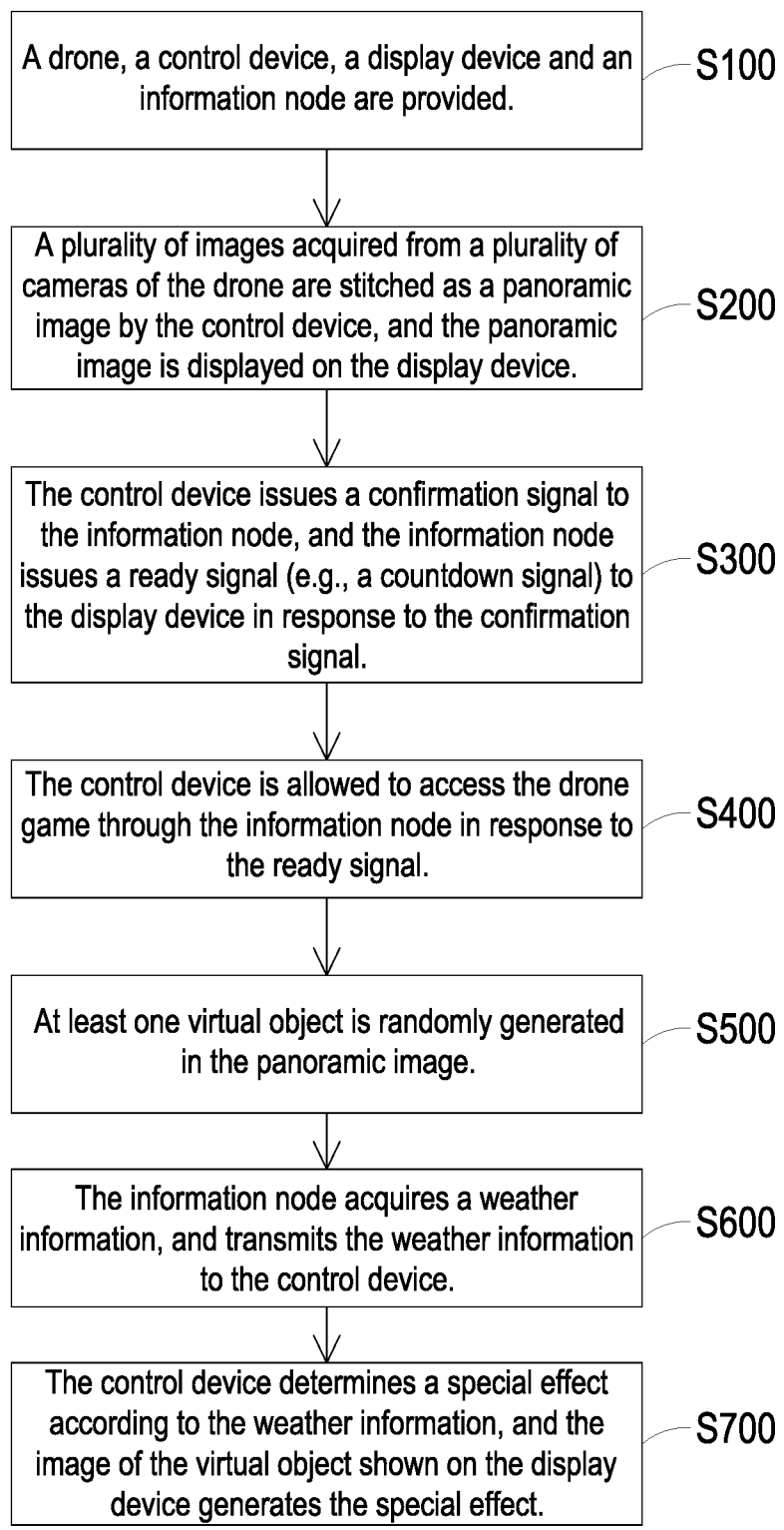
FIG. 4 is a flowchart illustrating a rendering method for a drone game according to a second embodiment of the present invention.

Pleases refer to FIG. 4. FIG. 4 is a flowchart illustrating a rendering method for a drone game according to a second embodiment of the present invention. In this embodiment, the rendering method of the drone game further includes steps S600 and S700 after the step S500.

In the step S600, the information node acquires a weather information, and transmits the weather information to the control device.

In the step S700, the control device determines a special effect according to the weather information, and the image of the virtual object shown on the display device generates the special effect. In some embodiment, the weather information is acquired through the internet. For example, the weather information is acquired from Central Weather Bureau, Japan Meteorological Agency, or the like. The weather information includes wind direction information, wind speed information, wind interval information, rain condition information, typhoon information, tornado information, sandstorm information or solar eclipse information. In some embodiments, the weather information is the local weather information that is sensed and acquired by a plurality of sensors connected with the information node. The local weather information includes wind direction information, wind speed information, wind interval information, rain condition information, typhoon information, tornado information, sandstorm information or solar eclipse information. By using the weather information, the rendering method of the present invention can have the function of simulating the local weather or the weather at a specific location. The weather information can be selectively used to simulate the corresponding weather environment according to the practical requirements. Moreover, according to the corresponding weather information, the special effect is a shaking effect, a vibration effect, a rotation effect, a blur effect or a light/shadow reduction effect. For example, the shaking effect is generated in response to gusts, the blur effect is generated in response to sandstorms, or the light/shadow reduction effect is generated in response to solar eclipse, but not limited thereto.

In the following example, the image of the virtual object shown on the display device is correspondingly moved according to the wind direction information and the wind speed information. For example, the wind direction information and wind speed information collected by the weather station or the wind speed calculator indicate that the wind blows from north to south and the wind speed corresponds to gentle wind (i.e., the wind force scale is 3). Under this circumstance, the center point of the virtual object is gradually moved from the generation point of the virtual object to the north within two seconds in several stages. Consequently, a visual shaking and drifting effect is generated. The aforementioned stages can be repeatedly done according to the actual wind conditions. The coordinates of the center point of the virtual object within two seconds in different stages will be listed in the following table.

TABLE 1

Weather information input: the wind blows from north to south, the wind force scale is 3, the positive value of the X axis denotes the north direction, and the negative value of the X axis denotes the south direction

| time point (s) | Center coordinate of generation point of the virtual object |
|---|---|
| 0 | (X + A, Y + B, Z + C) |
| 0~0.3 | (X + A + 2, Y + B, Z + C) |
| 0.3~0.6 | (X + A + 2 + 2, Y + B, Z + C) |
| 0.6~0.9 | (X + A + 2 + 2 + 2, Y + B, Z + C) |
| 0.9~1.2 | (X + A + 2 + 2 + 2, Y + B, Z + C) |
| 1.2~1.5 | (X + A + 2 + 2, Y + B, Z + C) |
| 1.5~1.7 | (X + A + 2, Y + B, Z + C) |
| 1.7~2 | (X + A, Y + B, Z + C) |

Since the image of the virtual object generates the visual shaking and drifting effect in response to the wind condition, the fun and diversity of the drone game are enhanced.

Figure 5A:
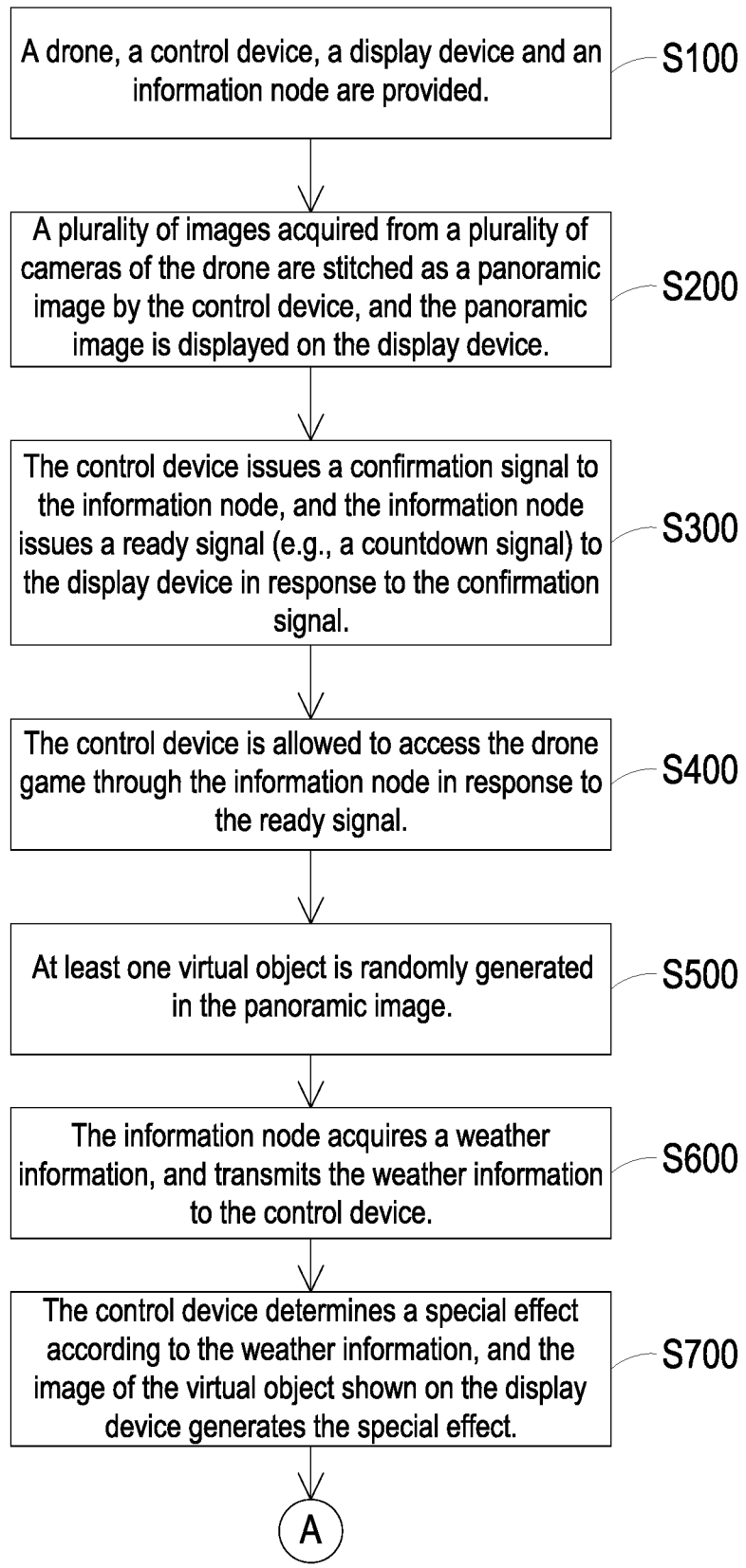
FIGS. 5A and 5B illustrate a flowchart of a rendering method for a drone game according to a third embodiment of the present invention.
Figure 5B:
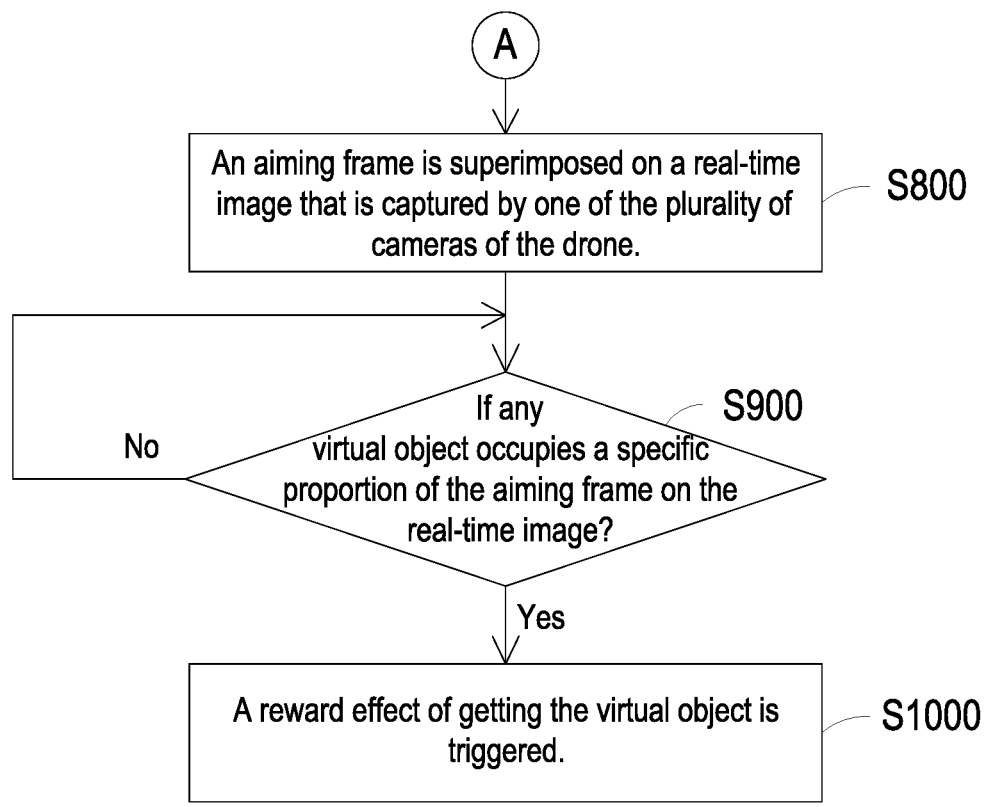
Figure 6:
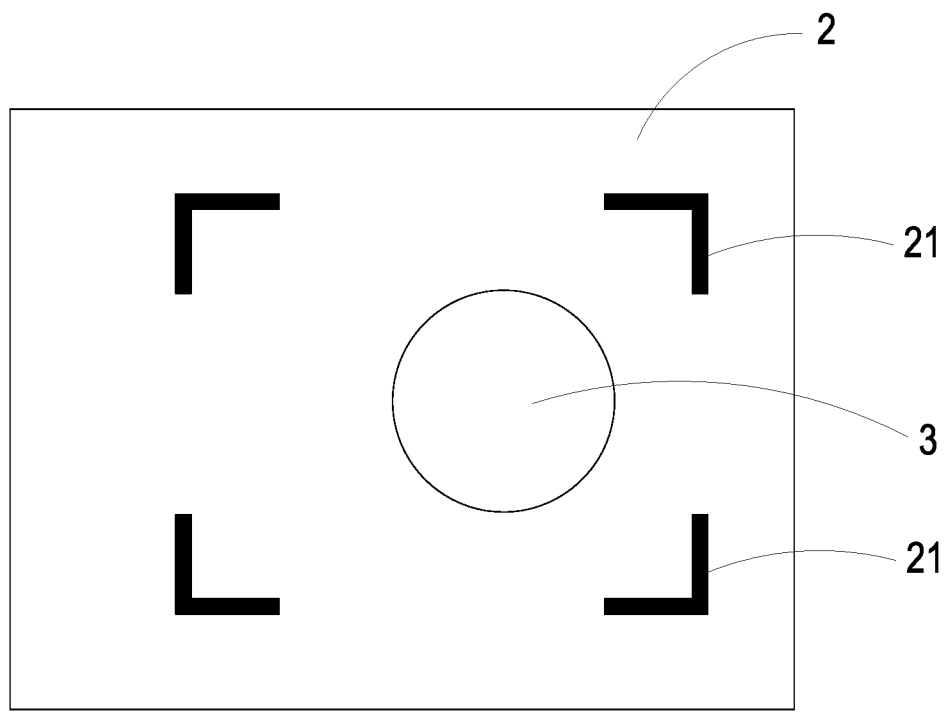
FIG. 6 is a schematic diagram illustrating an aiming frame and a virtual object displayed on a real-time image.

Please refer to FIGS. 5A, 5B and 6. FIGS. 5A and 5B illustrate a flowchart of a rendering method for a drone game according to a third embodiment of the present invention. FIG. 6 is a schematic diagram illustrating an aiming frame and a virtual object displayed on a real-time image. In this embodiment, the rendering method further includes steps S800, S900 and S1000 after the step S700.

In the step S800, an aiming frame 21 is superimposed on a real-time image 2 that is captured by one of the plurality of cameras of the drone.

Then, the step S900 is performed to determine whether any virtual object 3 occupies a specific proportion of the aiming frame 21 on the real-time image 2. For example, the specific proportion is greater than or equal to 75% of the aiming frame 21.

If the determining condition of the step S900 is satisfied (i.e., the virtual object 3 occupies the specific proportion of the aiming frame 21 on the real-time image 2), the step S1000 is performed after the step S900. In the step S1000, a reward effect of getting the virtual object 3 is triggered. Whereas, if the determining condition of the step S900 is not satisfied (i.e., the virtual object 3 doesn't occupy the specific proportion of the aiming frame 21 on the real-time image 2), the step S900 is repeatedly done (i.e., the step of determining whether any virtual object 3 occupies a specific proportion of the aiming frame 21 on the real-time image 2 is repeatedly done).

In an embodiment, the virtual object 3 is randomly or constantly generated by the computing unit of the drone. Moreover, the size change of the virtual object 3 is calculated by the computing unit of the drone according to the flight speed (or the motor speed) and the gyroscope direction. When the drone is closer to the virtual object 3, the virtual object 3 is gradually and visually enlarged. Correspondingly, the image of the virtual object 3 shown on the display device is moved toward the image of the aiming frame 21 on the display device and gradually enlarged.

In an embodiment, if the determining condition of the step S900 is satisfied (i.e., the virtual object 3 occupies the specific proportion of the aiming frame 21 on the real-time image 2, wherein the specific proportion is for example 75%), it is considered that the virtual object 3 has been gotten by the drone. Correspondingly, the virtual object 3 disappears in the real-time image 2, and a firework effect or any other appropriate visual sound and light effect can be played on the display device.

Figure 7A:
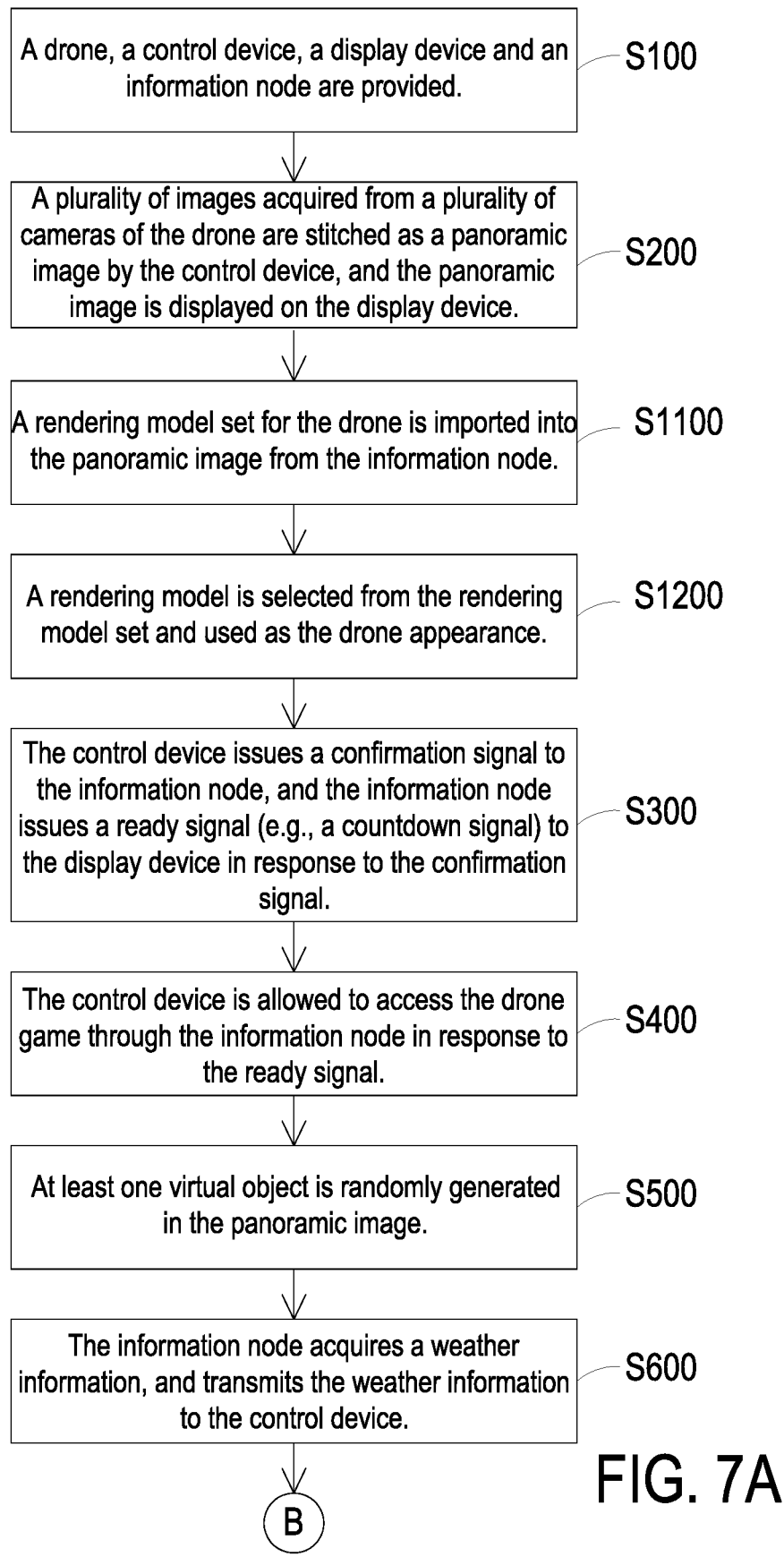
FIGS. 7A and 7B illustrate a flowchart of a rendering method for a drone game according to a fourth embodiment of the present invention.
Figure 7B:
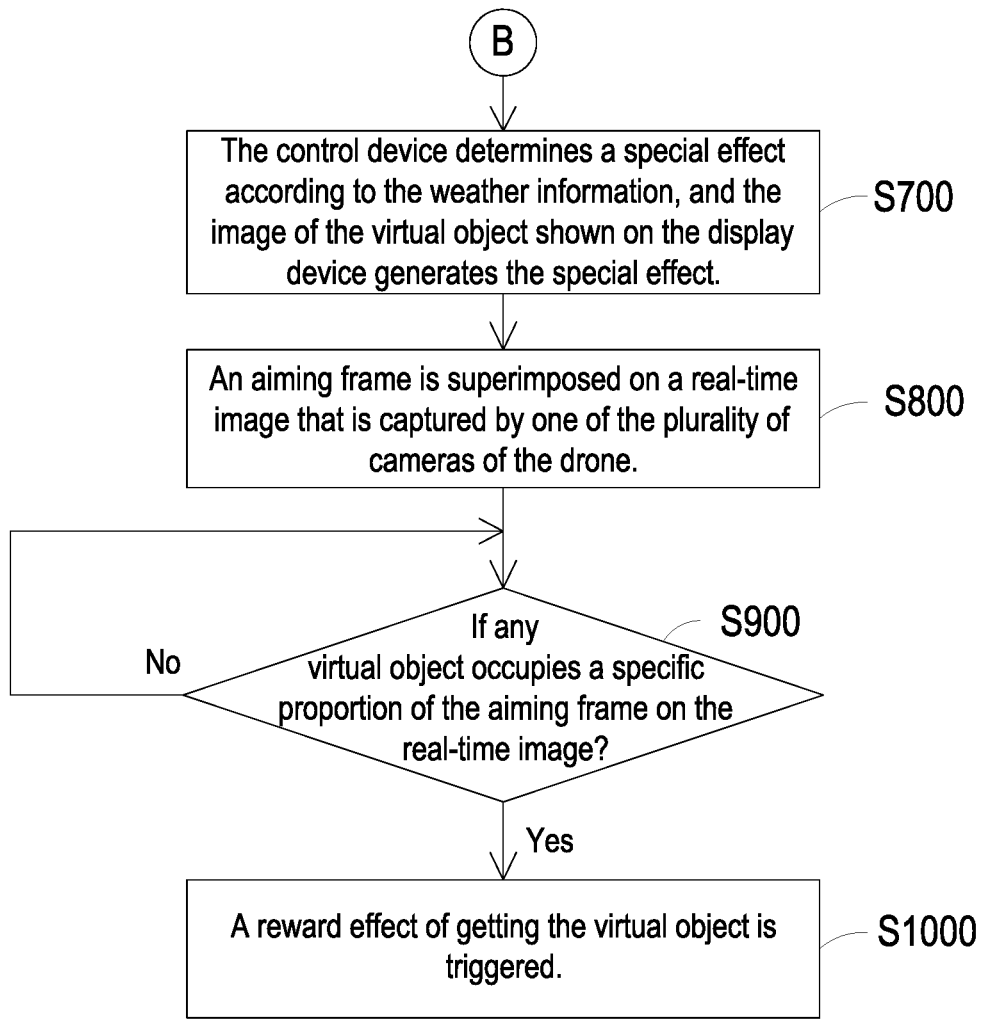

FIGS. 7A and 7B illustrate a flowchart of a rendering method for a drone game according to a fourth embodiment of the present invention. In this embodiment, the rendering method further includes a step S1100 and a step S1200 between the step S200 and step S300.

After the plurality of images acquired from the plurality of cameras of the drone are stitched into the panoramic image (in the step S200), the step S1100 is performed. In the step S1100, a rendering model set for the drone is imported into the panoramic image from the information node. Preferably but not exclusively, the rendering model set includes a fighter jet model, a space shuttle model, a space battleship model and any other appropriate appearance model. In some embodiments, the rendering model set imported into the panoramic image from the information node further includes an initial rendering model set and an advanced rendering model set to be applied in different occasions of drone games. In some embodiments, the rendering model set for the drone is imported into the panoramic image from an external device of the drone.

In the step S1200, a rendering model is selected from the rendering model set. For example, an initial rendering model is selected from the initial rendering model set and used as the drone appearance. Then, the control device issues a confirmation signal to the information node. After the confirmation signal is received by the information node, the subsequent steps after the step S300 are performed. For brevity, these steps are not redundantly described herein. In other words, after the step S1200 is completed, the rendering model representing the drone appearance is selected. After the confirmation signal is received by the information node, the rendering model representing the drone appearance is registered to the drone game, but it is not limited thereto.

Furthermore, the reward effect triggered in the step S1000 may specifically include increasing the score and displaying the score on the display device, or/and upgrading the drone appearance to one of a plurality of advanced rendering models, for example but not limited to a small space shuttle is upgraded to a space battleship. In some embodiments, in the step S1100, the rendering model set imported by the information node includes the initial rendering model and the advanced rendering model. The user can choose one of the initial rendering models at the beginning of the drone game, and the drone appearance can be randomly upgraded to any one of the advanced rendering models after the reward effect is triggered, or the user or the organizer can define the upgrading path of the advanced rendering models which can be adjusted according to the practical requirements. Then, different visual effects are produced to achieve the effect of making the drone game rich in changes.

From the above descriptions, the present invention provides a rendering method for a drone game. By the rendering method of the present invention, the rendering model of the drone is imported into the panoramic image, and the virtual object is randomly synthetized into the panoramic image. Consequently, the sound, light and entertainment effects of the drone game are effectively enhanced, and the fun and diversity of the drone game are increased. In an embodiment, the control device determines a special effect according to the weather information, and the image of the virtual object shown on the display device generates the special effect. Moreover, since a reward effect of getting the virtual object is triggered, the visual effect is diversified. Consequently, the diversity of the drone game is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rendering method for a drone game, the rendering method comprising steps of:
    (a) providing a drone, a control device, a display device and an information node, wherein the drone comprises a plurality of cameras;
    (b) stitching a plurality of images acquired from the plurality of cameras of the drone as a panoramic image by the control device, and displaying the panoramic image on the display device;
    (c) the information node issuing a ready signal to the display device;
    (d) the information node allowing the control device to access the drone game in response to the ready signal, thereby authorizing the control device to control a drone character in the drone game; and
    (e) generating at least one virtual object in the panoramic image.

2. The rendering method according to claim 1, wherein in the step (b), the panoramic image is generated by performing steps of:
    (b1) acquiring the plurality of images from the plurality of cameras;
    (b2) transmitting the plurality of images from the drone to the control device;
    (b3) allowing the plurality of images captured at the same time stamp to form an image set by the control device; and
    (b4) stitching the plurality of images in each image set as the panoramic image according to a plurality of key features of the plurality of images by the control device.

3. The rendering method according to claim 1, wherein after the step (e), the rendering method further comprises steps of:
    (f) the control device acquiring a weather information through the information node; and
    (g) determining a special effect according to the weather information, so that an image of the virtual object shown on the display device generates the special effect.

4. The rendering method according to claim 3, wherein the special effect is a shaking effect, a vibration effect, a rotation effect, a blur effect or a light/shadow reduction effect.

5. The rendering method according to claim 3, wherein the weather information is acquired through the internet, and the weather information includes wind direction information, wind speed information, wind interval information, rain condition information, typhoon information, tornado information, sandstorm information or solar eclipse information.

6. The rendering method according to claim 3, wherein the weather information is acquired through a plurality of sensors connected with the information node, and the weather information includes wind direction information, wind speed information, wind interval information, rain condition information, typhoon information, tornado information, sandstorm information or solar eclipse information.

7. The rendering method according to claim 3, wherein after the step (g), the rendering method further comprises steps of:
    (h) superimposing an aiming frame on a real-time image that is captured by one of the plurality of cameras on the drone;
    (i) determining whether any of the at least one virtual object occupies a specific proportion of the aiming frame on the real-time image; and
    (j) when any of the at least one virtual object occupies the specific proportion of the aiming frame on the real-time image, triggering a reward effect of getting the virtual object.

8. The rendering method according to claim 7, wherein the specific proportion is greater than or equal to 75%.

9. The rendering method according to claim 1, wherein between the step (b) and the step (c), the rendering method further includes steps of:
    (k) importing a rendering model set for the drone into the panoramic image from the information node or an external device; and
    (l) selecting a rendering model from the rendering model set as a drone appearance, and issuing a confirmation signal to the information node.

10. The rendering method according to claim 1, wherein the control device is a handheld remote controller, the display device is a panel monitor integrated into a handheld remote controller device or a head-mounted display, and the information node is a base station.

11. The rendering method according to claim 1, wherein the at least one virtual object is generated randomly.

12. The rendering method according to claim 1, wherein the ready signal is a countdown signal.

* * * * *